United States Patent
Senechal et al.

(10) Patent No.: US 6,292,523 B1
(45) Date of Patent: Sep. 18, 2001

(54) DIGITAL ENGINEERED SAFETY FEATURES ACTUATION SYSTEM

(75) Inventors: Raymond R. Senechal, East Hartford; Gary D. Althenhein, Enfield; Donald D. Zaccara, Winsted; Stephen G. Bransfield, Kensington; Robert E. Bryan, Bloomfield, all of CT (US); Arthur G. King, Southwick, MA (US); Glenn J. McCloskey, Canton, CT (US); Frank J. Safryn, East Granby, CT (US); Stephen J. Wilkosz, Vernon, CT (US); Paul L. Yanosy, Enfield, CT (US)

(73) Assignee: Westinghouse Electric Company LLC, Monroeville, PA (US)

( * ) Notice: Subject to any disclaimer, the term of this patent is extended or adjusted under 35 U.S.C. 154(b) by 0 days.

(21) Appl. No.: 09/076,094

(22) Filed: May 12, 1998

Related U.S. Application Data

(60) Provisional application No. 60/048,922, filed on Jun. 6, 1997, and provisional application No. 60/048,923, filed on Jun. 6, 1997.

(51) Int. Cl.[7] .................................................. G21C 17/00
(52) U.S. Cl. ........................ 376/259; 376/215; 376/216; 376/217; 376/245
(58) Field of Search .................................. 376/215–218, 376/259, 245

(56) References Cited

U.S. PATENT DOCUMENTS

| | | | |
|---|---|---|---|
| 3,855,536 | * 12/1974 | Neuner | 328/92 |
| 3,855,590 | * 12/1974 | Neuner | 340/413 R |
| 3,888,772 | 6/1975 | Neuner | 250/199 |
| 4,427,620 | * 1/1984 | Cook | 376/216 |
| 4,661,310 | 4/1987 | Cook et al. | 376/259 |
| 4,664,870 | * 5/1987 | Hager | 376/215 |
| 4,687,623 | * 8/1987 | Cook | 376/259 |
| 4,692,299 | * 9/1987 | Crew et al. | 376/216 |
| 4,752,869 | 6/1988 | Miller et al. | 364/187 |
| 5,267,277 | 11/1993 | Scarola et al. | 376/216 |
| 5,287,264 | * 2/1994 | Arita et al. | 364/184 |
| 5,287,390 | 2/1994 | Scarola et al. | 376/216 |
| 5,586,156 | * 12/1996 | Gaubatz | 376/216 |
| 5,621,776 | 4/1997 | Gaubatz | 376/242 |

FOREIGN PATENT DOCUMENTS

| | | | |
|---|---|---|---|
| 2 180 975 | 4/1987 | (GB) | 376/215 |
| 2183411 | * 6/1987 | (GB). | |
| WO 97/49020 | 12/1997 | (WO) | 376/215 |

OTHER PUBLICATIONS

PCT International Preliminary Examination Report; Sep. 23, 1999; for Application No. PCT/US98/10895.
PCT Written Opinion; May 19, 1999 for Application No. PCT/US98/10895.

* cited by examiner

Primary Examiner—Charles T. Jordan
Assistant Examiner—Jack Keith
(74) Attorney, Agent, or Firm—Ronald P. Kananen; Rader, Fishman & Grauer

(57) ABSTRACT

An interface between a Plant Protection System and Engineered Safety Features in a nuclear power plant is disclosed for continuously monitoring the plant protection system initiation circuit for each remotely actuated Engineered Safety Feature system to effect remedial action in the event that the Plant Protection System generates a 'trip' signal. By using actuation inputs from the Plant Protection System and manual, operator implemented inputs, controls are provided for remote equipment components, such as solenoid valves, motor operated valves, pumps, fans and dampers.

26 Claims, 8 Drawing Sheets

DIGITAL ENGINEERED SAFETY FEATURES ACTUATION SYSTEM

The subject matter of the present application is disclosed in applicants' co-pending Provisional U.S. Patent Application Nos. 60/048,922 and 60/048,923, both filed Jun. 6, 1997, from both of which priority is claimed.

CROSS REFERENCE TO RELATED APPLICATION

The subject matter of this provisional application generally relates to the subject matter in pending U.S. application Ser. No. 08/848,556, filed Apr. 29, 1997, based on a provisional application filed on Jun. 20, 1996, the disclosure of which is incorporated herewith for completeness of disclosure. In addition, the subject matter of this application is related to that disclosed in an application U.S. Pat. No. 6,049,578 filed on Apr. 30, 1998 the present inventors and entitled "Digital Plant Protection System," the subject matter of which is incorporated herein by reference.

BACKGROUND OF THE INVENTION

In nuclear power plants, independent shut-down and safe-operation systems are dedicated to monitoring plant operation and evaluating numerous safety-related parameters. In the event one or more measured parameters indicate the existence of an unsafe condition, the shut-down system and/or the safe-operation system can automatically effect the appropriate remedial action. It is imperative that these safety control systems, known as plant protection systems, operate reliably, and accordingly, it is imperative that all measured and sensed parameters be valid.

In the context of nuclear plant protection systems, it is not uncommon to measure a multitude of parameters related to plant operation. These parameters include, for example, temperatures, pressures, flow rates, power density, neutron flux, fluid levels, etc. Other functions of the plant protection system include the status-monitoring of various components including valves, pumps, motors, control devices and generators.

Additionally, the plant protection system, under certain defined conditions, may initiate a reactor trip (RT), i.e., the rapid, controlled, and safe shut-down of the reactor by actuating various field systems and remote actuation devices. In the case of a pressurized light water reactor, the shut-down is often accomplished by the lowering of moderating control rods into the reactor core to cause the reactor to become sub-critical.

In co-pending U.S. application Ser. No. 08/848,556 noted above, an invention for use in the nuclear industry is disclosed for providing an Automatic Self-Testing system for remote sensors utilizing multi-sensor, multi-channel redundant monitoring and control circuits. The system senses or measures a parameter by a plurality of independent and sensor specific processing paths, each of which is provided with parallel redundant sub-paths that can each be sequentially inserted into the processing path to effect normal processing or be disassociated from the processing path to effect testing. Each sensor provides, either directly or indirectly, a digital value to a comparator which compares the measured value with a predetermined value that is, in turn, provided to coincidence logic that evaluates the output of its comparator with the input of the comparators of the other processing paths to provide an output indicative of a pass/fail condition. That invention advantageously provides an automatic self-testing system for verifying both the signal path processing functions and the validity of various logic states in parameter sensing systems, particularly parameter sensing systems using multiple redundant processing paths.

In copending U.S. Provisional Application Ser. No. 60/048,922, noted above (the contents are incorporated by reference herein), an invention for use in the nuclear industry is disclosed for providing a Digital Plant Protection System (DPPS) that utilizes digital signals and which has a greater mean time between failure. The DPPS is characterized by a plurality of cross-connected sensed-parameter processing channels that provide a suitably conditioned digital value to a digital comparator that tests the conditioned digital value against a pre-determined value to determine whether or not the sensed-parameter has been exceeded. A comparator is associated with each of the plural channels and receives a separate measurement of the sensed parameter for each channel. If a sensed-parameter is determined to be out-of-specification on a two-out-of-four basis, a 'trip' signal is generated to effect remedial action.

BRIEF SUMMARY OF THE INVENTION

It is an object of the present invention to provide a digital interface between the DPPS and Engineered Safety Features (ESF) of a nuclear power plant.

It is a further object of the present invention to provide a Digital Engineered Safety Features Actuation System (DESFAS) for use with pressurized water reactors.

Coordinated with the prior discussed system of the '556 copending application, a Digital Plant Protection System (DPPS) has been developed, as noted above. Together, the DPPS, the Automatic Self Testing System described above and the DESFAS of the present invention constitute a nuclear plant reactor protection system. The DESFAS continuously monitors the DPPS initiation circuit for each ESF system. Thus, the present invention provides an interface between the DPPS and remote actuation devices which effect remedial action in the event that the DPPS generates a 'trip' signal. According to the present invention, by using actuation inputs from the DPPS and manual, operator implemented inputs, controls are provided for remote equipment components, such as solenoid valves, motor operated valves, pumps, fans and dampers.

U.S. Pat. No. 5,267,277, issued Nov. 30, 1993, assigned to the assignee of this invention describes in detail a prior control system known by the trademark "NUPLEX 80+". It is another overall and general object of this invention to retrofit or interface with the nuclear plant control component control systems, including those described in the '277 patent. Accordingly, the disclosure of the '277 patent is incorporated by reference.

Thus, a primary object of this invention is to provide a digital interface with existing or recently-developed component control systems.

Other objects and features of the invention will be seen from a detailed review of this specification and the accompanying drawings taken with the materials incorporated by reference.

BRIEF DESCRIPTION OF THE DRAWINGS

In the drawings:

FIG. 10 is a block diagram of a universal optically isolated selectable system, wherein

DETAILED DESCRIPTION OF THE PREFERRED EMBODIMENTS

Figure 1:
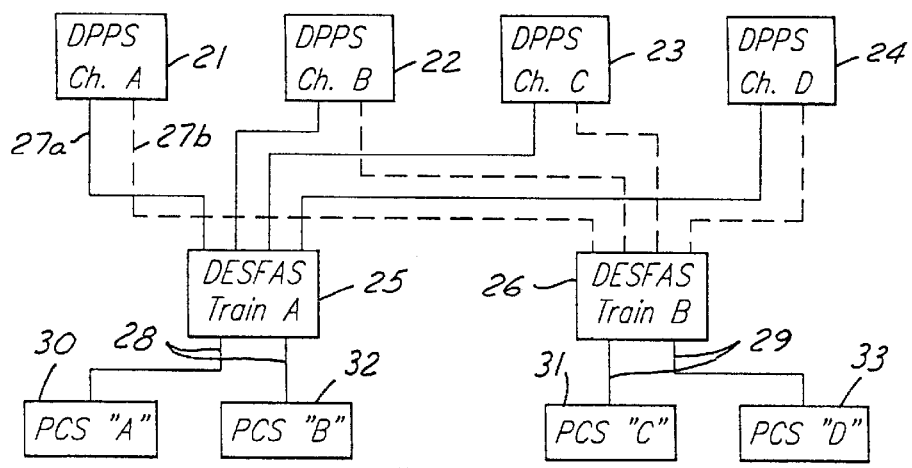
FIG. 1 is a functional block diagram showing the inter-relationship between the outputs of the DPPS system communicating with the DESFAS system of the invention communicating with a plurality of ESF Component Control Systems.

FIG. 1 shows a functional block diagram for a Digital Engineered Safety Features Actuation System (DESFAS) interfacing with a Digital Plant Protection System (DPPS) discussed above, shown generally by the reference numeral 20. As noted above, the DPPS is characterized by a first plurality, preferably four, of cross-connected sensed-parameter processing channels A through D, designated respectively as channels 21 through 24 (no cross-connections are shown in FIG. 1). Each channel provides a suitably conditioned digital value (not shown) to a digital comparator (not shown) that tests the conditioned digital value against a pre-determined value to determine whether or not the sensed-parameter has been exceeded. If a sensed-parameter is determined to be out-of-specification on a two-out-of-four channel basis, a 'trip' signal is generated to effect remedial action.

In FIG. 1, each DPPS channel 21 through 24 generates a second plurality of actuation or initiation outputs for transmission to a like plurality of DESFAS trains. In a preferred configuration, shown in FIG. 1, two trains A and B are shown, designated respectively as trains 25 and 26. Thus, in the preferred configuration, channel 21 generates two actuation or initiation outputs 27a and 27b, one which is transmitted to train 25 and the other which is transmitted to train 26. Similarly, channels 22 through 24 generate a like number of actuation or initiation outputs.

Each of the channels 21 through 24 provides redundant actuation or initiation outputs for one of many Engineered Safety Features (ESF) systems. Various ESF systems monitored by DPPS channels include: (1) primary systems comprising a Safety Injection Actuation Signal (SIAS), a Containment Isolation Actuation Signal (CIAS), and a Recirculation Actuation Signal (RAS); and (2) secondary systems comprising a Containment Spray Actuation Signal (CSAS), a Main Steam Isolation Signal (MSIS), and Auxiliary Feedwater Actuation Signals AFAS 1 and AFAS 2. These signals are also outputs from a conventional plant protection system.

As noted above, actuation or initiation outputs such as 27a and 27b are provided to a pair of Trains A and B of the invention of the subject application. It should be understood that the DESFAS Auxiliary Cabinets, to be discussed below, are required for Train A and Train B, and that this specification typically describes in detail only a single Train.

The outputs 28 and 29 from the Trains 25 and 26 are provided to four Component Control Systems 30 to 33 for controlling the components such as pumps and valves according to the status of the initiation signals. Actuation of various ESF systems controlled by Component Control Systems 30 through 33 is discussed in greater detail below.

Figure 3:
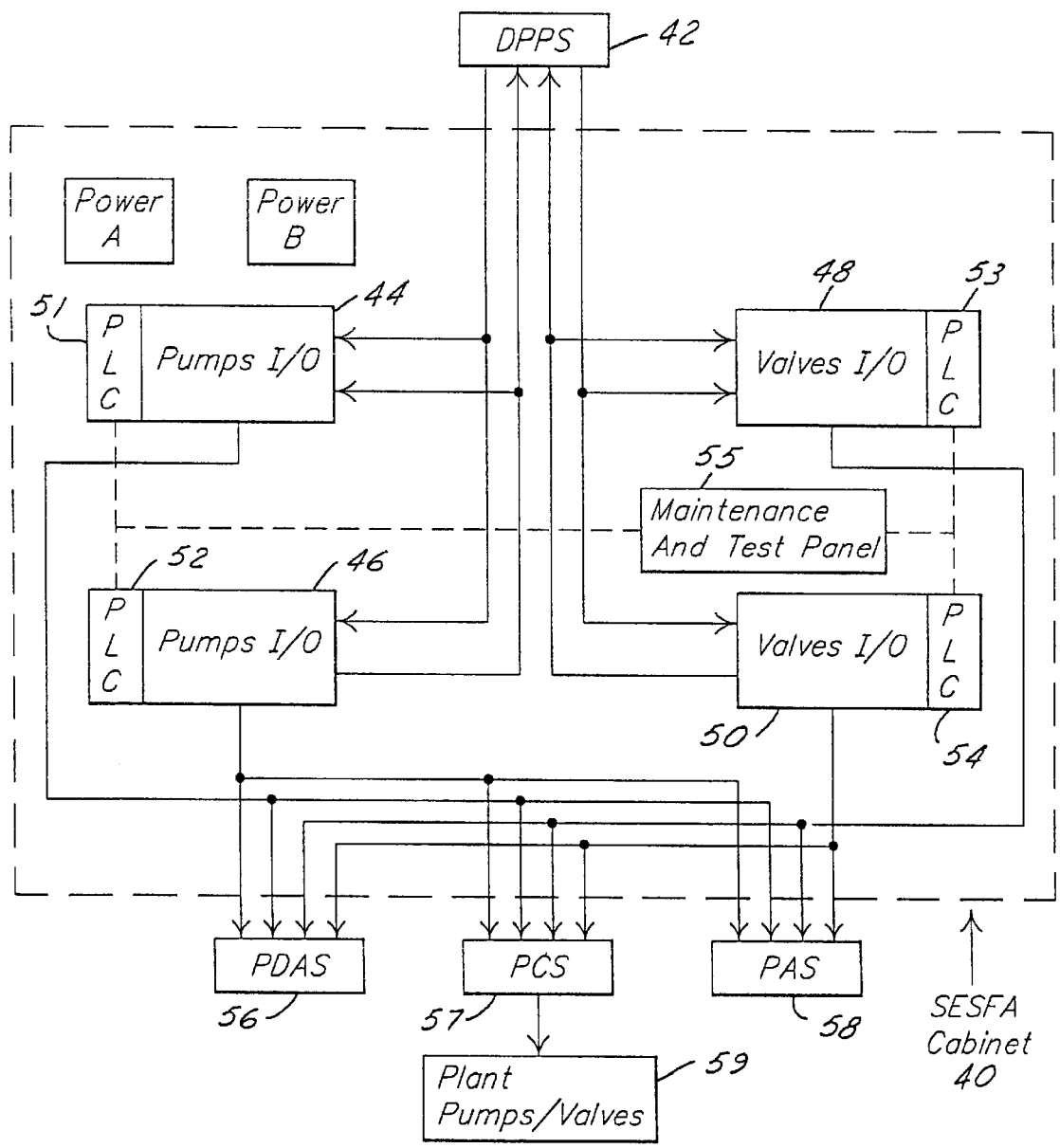
FIG. 3 is a block diagram of a digital ESFAS cabinet control system of the invention, showing a typical train of the two-train system according to the invention.
Figure 4:
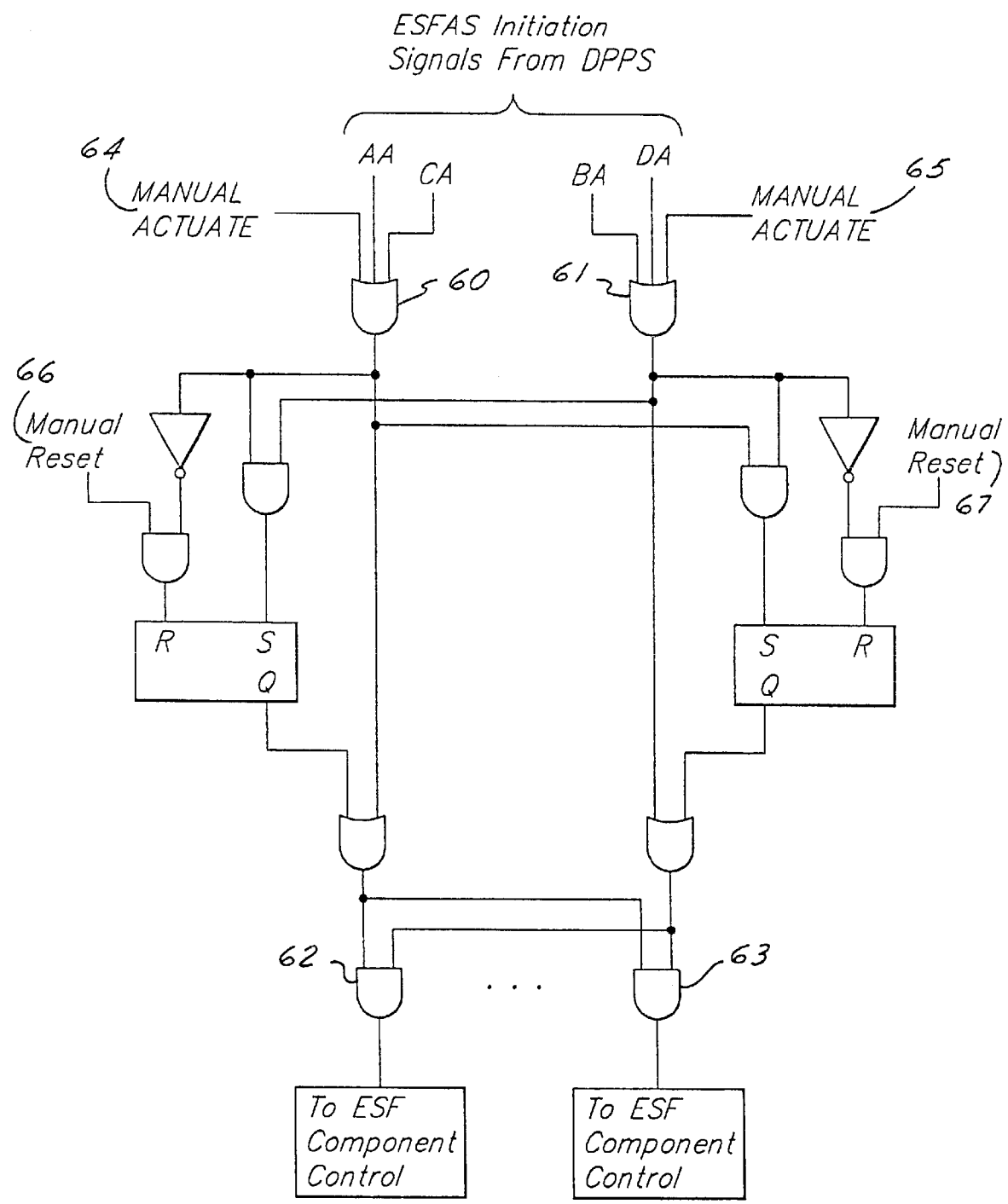
FIG. 4 is a functional block diagram of a typical DESFAS auxiliary cabinet logic diagram according to the invention.

Before proceeding to a detailed discussion of the components which comprise the DESFAS of the present invention, the overall functioning of the system will be discussed to present an operational overview. It is important to note that the DESFAS Auxiliary Cabinets serve as an interface between the ESFAS portion of the DPPS, as seen from FIG. 1 and the remote actuation devices (not shown). The DESFAS Auxiliary Cabinets contain the circuits which interface with the Plant Control System (PCS) which actuate ESF systems, including the solenoid valves, motor operated valves, pumps, fans, and dampers, upon receipt of a DESFAS signal, i.e. an actuation or initiation signal, from the DPPS, according to established specifications. The ESF systems are actuated independently by a selective two-out-of-four logic, as shown in FIGS. 3 and 4, which will be further discussed. In addition, simultaneous operation of two manual pushbuttons, shown in FIG. 4 as MANUAL ACTUATE signals of a particular ESF system, will also cause actuation of that system. The DESFAS of the present invention also includes maintenance and test panel (MTP) interfaces to test both DPPS initial input interfaces as well as the function of the DESFAS trip logic.

Once an actuation has been initiated, the trip logic is locked out and will not reset automatically when the DPPS/DEFAS initiation signal has cleared. The trip logic must be manually reset after the DPPS/DESFAS initiation signal has cleared. The DESFAS design includes terminal blocks to interface with the Remote Initiation Reset Panel on the Main Control Board (MCB). The lockout and reset features are applicable to all ESF systems except cycling as follows: select circuits in the Auxiliary Feedwater Actuation Systems 1 and 2, and the Main Steam Isolation System are not locked out and do not require resetting.

The DESFAS equipment is arranged to control two groups whose actuation circuits are mechanically separated. One of the groups will include all fans and pumps, while the second group includes its other valves and dampers, as shown in FIG. 3.

Figure 6:
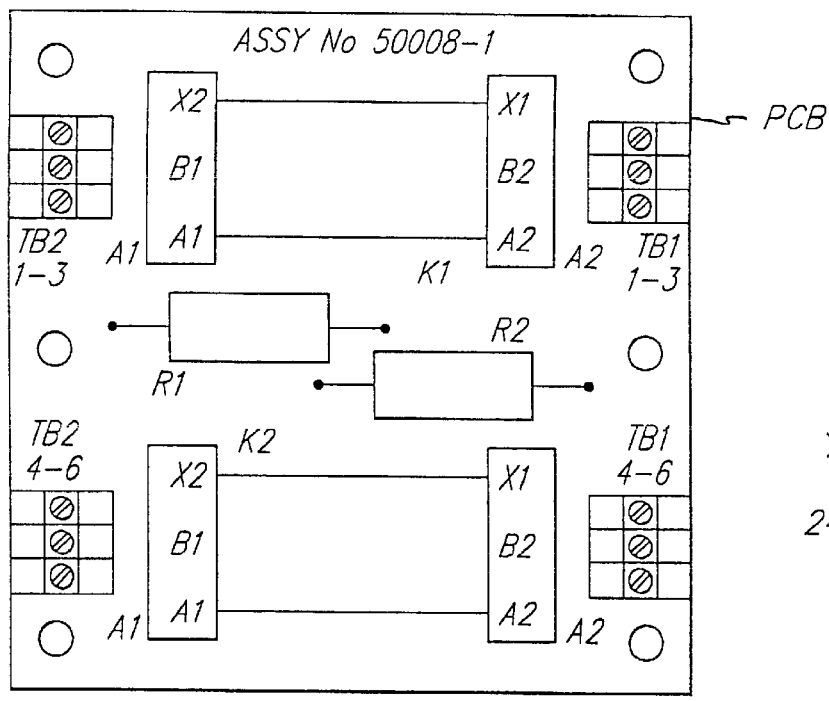
FIG. 6 is a pictorial plan view of a printed circuit board with board-mounted relays and voltage dropping resistors.

Within each group, smaller subgroups are arranged such that testing of several components may be performed simultaneously without affecting normal plant operation, as shown in FIG. 6 and as described in the '556 copending application as noted above.

A test selector switch or keypad on the Maintenance and Test Panel 55 as shown in FIG. 3 selects the desired sub-group. Manual controls are provided to actuate the subgroups manual trip and to lock out relays. DPPS initial input interfaces may also be tested without any component (pump or valve) actuation.

Before returning to the detailed drawings, it should be noted that the DESFAS Auxiliary Cabinets continuously monitor the DPPS initiation circuit output for each ESF system, as shown in FIG. 1. Annunciation (not shown) is provided for the initiation circuit actuation. The DESFAS Auxiliary Cabinets will automatically initiate protective action upon receipt of the selective two-out-of-four initiation inputs from the DPPS for each ESF system, as discussed in the concurrently filed provisional application mentioned above.

It will be appreciated that the connections between the DPPS Channels A to D, the DESFAS Trains A and B, and the CCS channels A to D are multi-signal for providing isolated signals among the components such as by fiber-optic communication or isolated conductive wire components such as copper. Isolated status and test feedback signals are provided from Trains A and B to the DPPS Channels 21 to 24, and between Trains 25 and 26 through the maintenance and test panel 55 (FIG. 3).

A detailed description of all features of the DESFAS of the present invention will now be provided.

Figure 2:
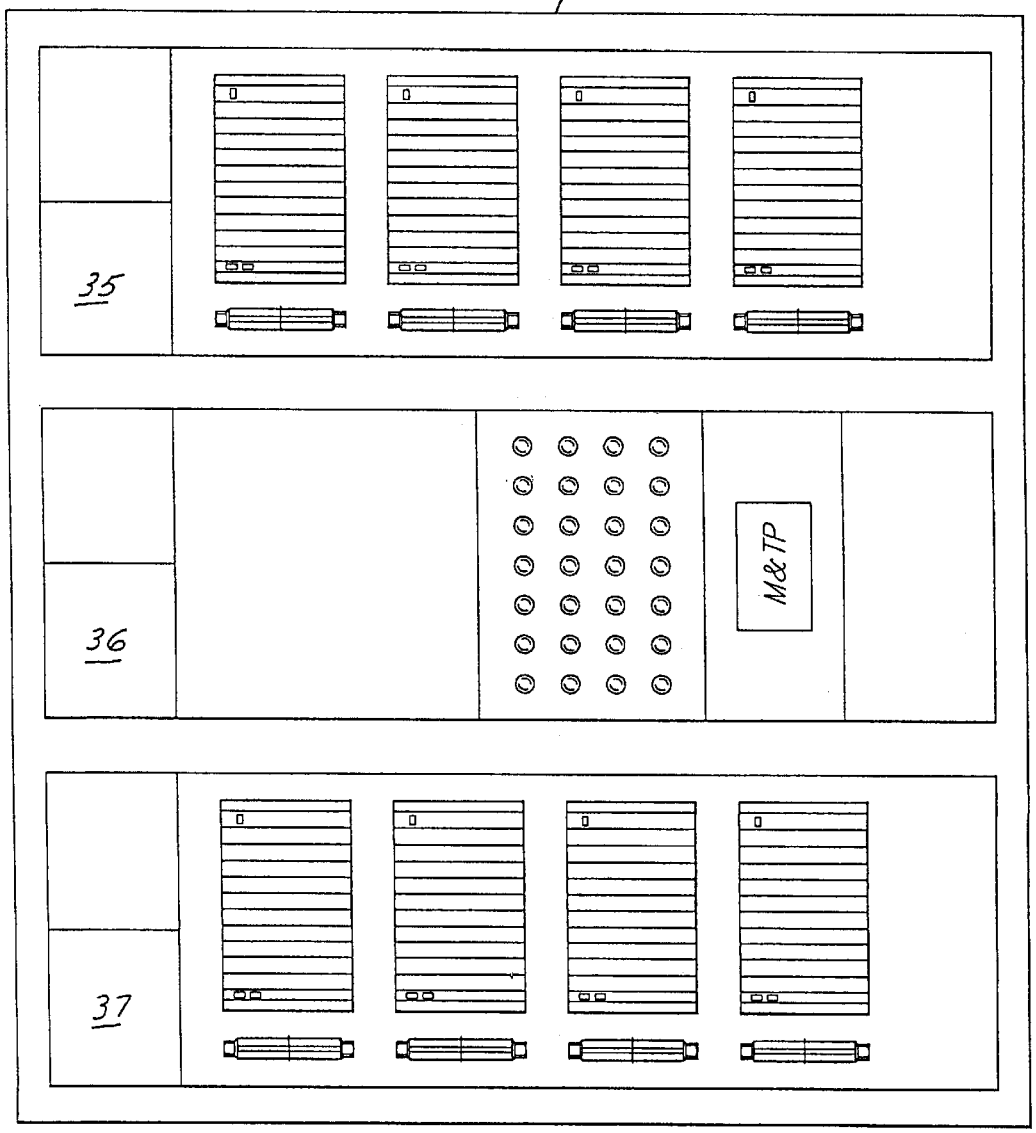
FIG. 2 is a frontal plan view of a digital ESFAS auxiliary cabinet for use with the system of the invention.

FIG. 2 shows a single Digital ESFAS Auxiliary Relay Cabinet, shown with its front doors removed to illustrate the functional layout of the system. As mentioned above, the DESFAS is designed as two completely separated cabinets, one to house each of trains A and B (references 25 and 26 of FIG. 1). One cabinet, as representatively shown in FIG. 2 by the reference numeral 34, will actuate Train A components and the other cabinet (not shown) will actuate Train B components. The two cabinets are substantially identical in construction with the exception of the cabinet nameplate and the terminal block color coding. The cabinets physically are arranged to comply with design criteria conventional in the art.

The cabinet 34 of FIG. 2 shows three locations 35 to 37 for receiving the actuation and initiation signals from DPPS channels A to D as shown in FIG. 1 and for housing those interconnections discussed in that figure.

FIG. 3 generally shows the DESFAS Auxiliary Cabinet Actuation Logic and Circuits for a single DESFAS cabinet, designated by the reference numeral 40, in a functional block diagram form. A main purpose of the FIG. 3 arrangement 40 is to actuate DESFAS components upon receipt of a DESFAS channel signal from a typical channel of the DPPS 42.

Within the DESFAS cabinet 40, the logic and I/O of the DESFAS is divided into two groups. Those groups are directed to pumps I/O 44, pumps I/O 46, valves I/O 48, and valves 1/O 50, each of which is connected to and from the DPPS output circuits for a representative one of the DPPS Channels A to D, as seen in FIG. 3. Each group thus has its own programmable logic controller (PLC) and I/O. The functional division of the PLCs is as follows: two PLCs 51 and 52 manage the pumps and fans in the safety features systems SIAS, CIAS, RAS, CSAS, AFAS-4 and AFAS-2 as shown in FIG. 3 and as discussed in connection with FIG. 1. Two PLCs 53 and 54 manage the valves and dampers in the safety features systems previously mentioned. The components thus discussed are housed in the ESFAS cabinet 40.

When the DESFAS Auxiliary Cabinet receives initiation signals from the DPPS 42, a DESFAS PLC 51, 52, 53, 54 actuates DESFAS subgroup relays on a selective two-out-of-four basis. The sub-group relays in turn operate necessary components for complete system actuation. A maintenance and test panel (MTP) 55 is provided for intercommunications between the primary and secondary systems, as well as to monitor each system and initiate testing of the logic within each system.

The outputs of the logic and I/O groups 44, 46, 48 and 50 are selectively provided to the systems Plant Data Acquisition System (PDAS) 56, PCS 57, and Plant Annunciator System (PAS) 58, wherein the PCS system 57 operations the Plant pumps and valves as suggested by the block 59. Note that the solid lines represent a hardwired interface between the DPPS operating in a bi-directional mode, while the dashed lines connecting with the MTP provide a data link between the pump and valve systems.

Typical logic for all ESF actuations except AFAS-1 and AFAS-2 and MSIS is shown in FIG. 4 wherein ESFAS initiation signals from the DPPS are provided to OR gates 60 and 61 providing outputs to the combinations of NOT gates, AND gates, time delay circuits and Latch circuits resulting in presentation of logic signals to the output AND gates 62 and 63.

According to the logic of FIG. 4, the ESF systems are actuated independently by a selective two-out-of-four logic. In addition, simultaneous operation of two manual pushbuttons of a particular ESF system will cause actuation of that system. In FIG. 4, manual pushbuttons are represented by MANUAL ACTUATE inputs 64 and 65. In a preferred logic arrangement, once an actuation has been initiated, the trip logic is locked out and will not reset automatically when the DPPS/DESFAS initiation signal has cleared. Instead, the DESFAS design includes terminal blocks to interface with a Remote Initiation and Reset Panel (not shown) on the Main Control Board (not shown) for the power plant. A simultaneous operation of two MANUAL RESETS 66 and 67 manually resets trip logic after an initiation signal has cleared. The described lockout and reset features are preferably applicable to all above-described ESF systems except for select circuits within the AFAS 1 and 2 and the MSIS, both of which are not locked out and do not require resetting.

Figure 5:
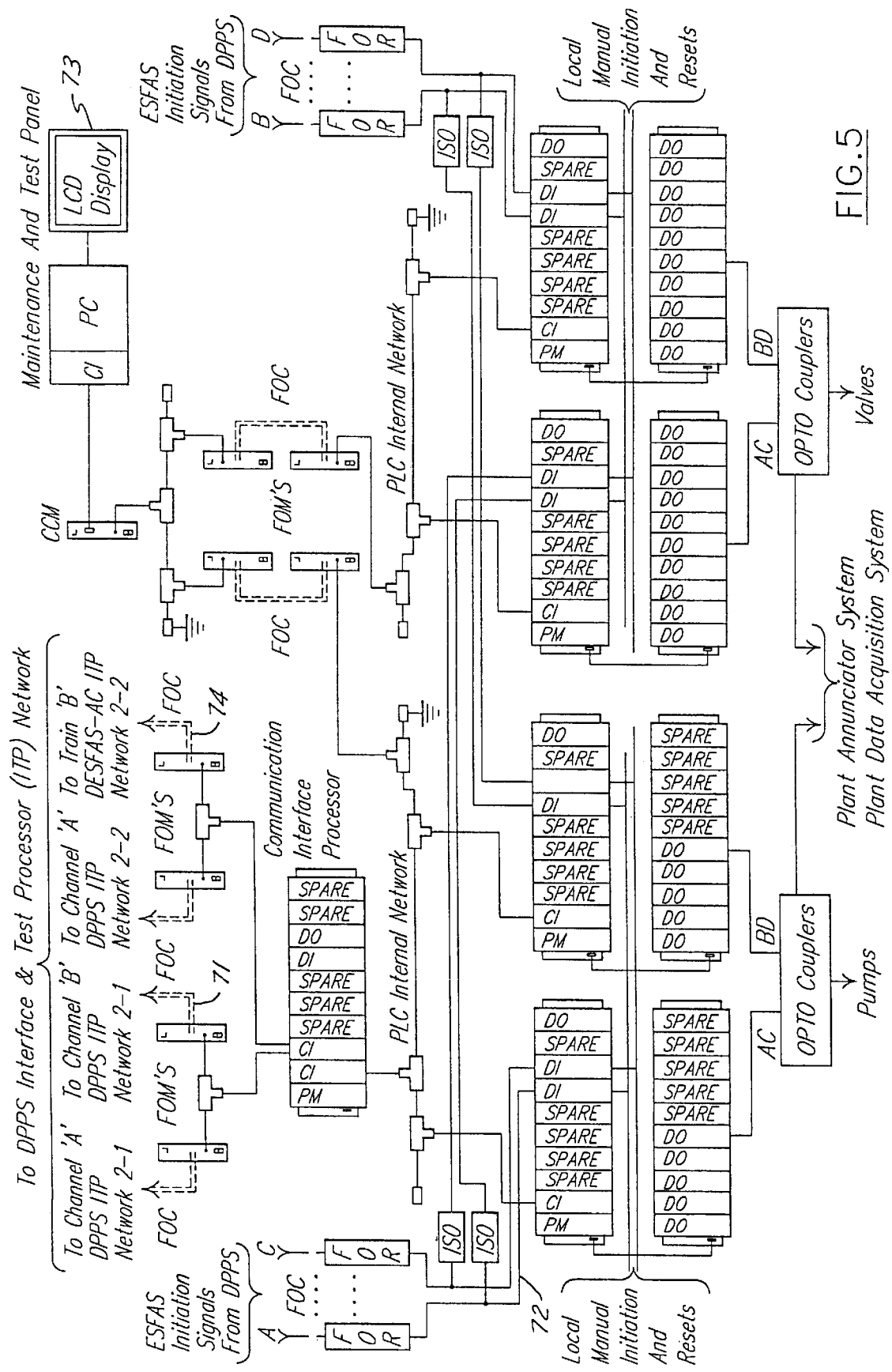
FIG. 5 is a DESFAS single train block diagram in greater detail than FIG. 3.

FIG. 5 shows a detailed block diagram of a single Train A, indicated generally by reference 70, to provide redundant communications and processors. Each of the four subgroupings shown in FIG. 5 may represent logic and I/O groups of FIG. 3, wherein each of the groups may also include further redundancy as needed. Advantageously, the redundant communications and processors are interconnected via fiber optic lines 71, leading to a substantial reduction in the amount of relays, fuses and general wiring is achieved with the DESFAS of the present invention. Actuation or initiation signals are transmitted to each subgroup relay through fiber optic cable 72, which also carries ESF system actuation. information from DESFAS train A to field components (not shown). All information is also communicated to Maintenance and Test panel 73 of DESFAS Train A, which performs the functions as described above with reference to FIG. 3. Trains A and B are further interconnected with fiber optic line 74.

Figure 6B:
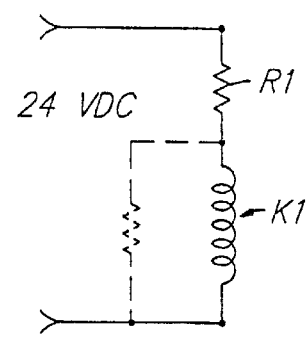
FIG. 6B is a schematic circuit diagram of a voltage-dropping resistor in series with the coil of its relay.
Figure 6A:
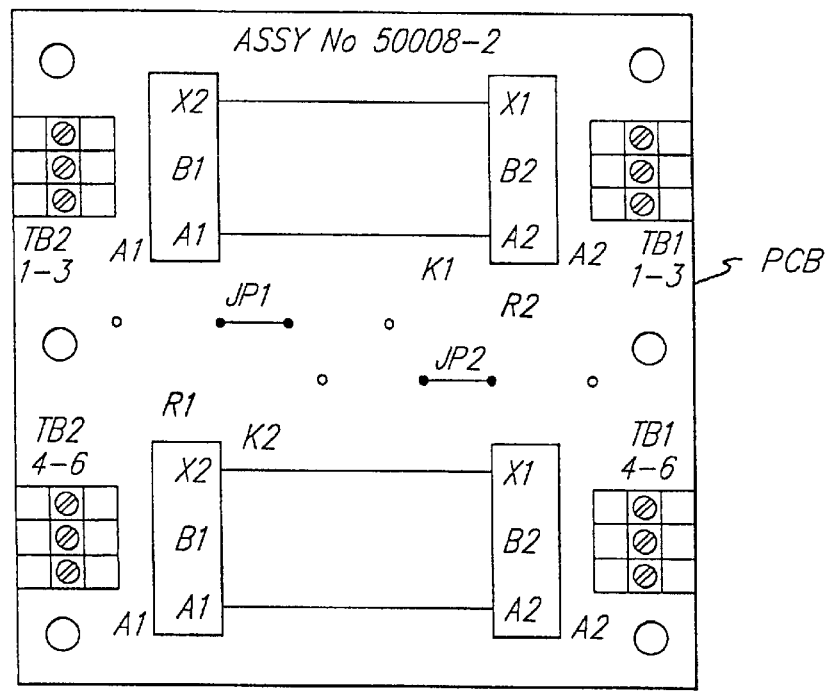
FIG. 6A is a pictorial plan view of the printed circuit board of FIG. 6 with connecting jumpers substituted for the resistors.
Figure 6C:
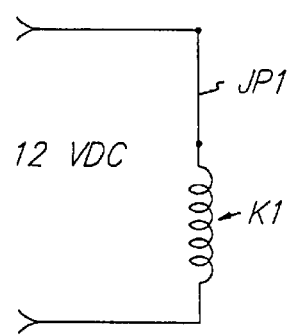
FIG. 6C is a schematic circuit diagram of a jumper wire in substitution for the voltage dropping resistor.

Each ESF system also utilizes electromechanical relays as part of its operation system. In general, commercial programmable logic controllers (PLC), depending upon their manufacturer, provide a 24 VDC output or a 12 VDC output to energize or de-energize the coil of a power-switching relay. Oftentimes, relays that are optimally suited for a particular power-switching function are those designed to be energized by 12 VDC and these relays must often be mated to a 24 VDC PLC. In order to provide a measure of installation flexibility for 12 VDC relays in those situations in which the relay can be driven by either a 12 VDC or a 24 VDC source, the present invention utilizes a printed circuit board (PCB) mounted relay organization that can be used in either 24 VDC or 12 VDC systems. As shown in FIG. 6, a printed circuit board PCB is provided with two relays K1 and K2 and two voltage-dropping resistors R1 and R2. The relays K1 and K2 have 12 VDC coils and my be obtained, for example, from the KiloVac Corporation. As shown in FIG. 6B (for the relay K1) the voltage-dropping resistor R1 is in series-circuit with the coil of the relay K1. The resistance value of the voltage-dropping resistor R1 is chosen so that the resistor R1 and the coil K1 define a voltage divider that will provide 12 VDC to the coil K1 when the supply voltage is 24 VDC. In this way, a 12 VDC relay can be used with a 24 VDC supply. In the event that the relay K1 is to be used with a 12 VDC supply, the voltage-dropping resistor R1 is removed and a wire jumper JP1 is wired or otherwise inserted into the circuit in substitution for voltage dropping resistor R1. Similarly, the voltage-dropping resistor R2 is removed and a wire jumper JP2 is wired or otherwise inserted into the circuit in substitution for voltage dropping resistor R2. Substitution of jumpers for voltage dropping resistors is shown in FIG. 6A. As shown in the diagram of FIG. 6C, the jumper JP1 allows the 12 VDC coil K1 to be connected directly to a 12 VDC source. The circuitry for the relay K2 is the same as described for the relay K1. In FIG. 6B, a second resistor (unnumbered) is shown in dotted line illustration; this second resistor may used use to define a true voltage divider with the resistor R1 with the operating voltage for the coil of the relay K1 provided from the intermediate connection between the two resistors.

Figure 7:
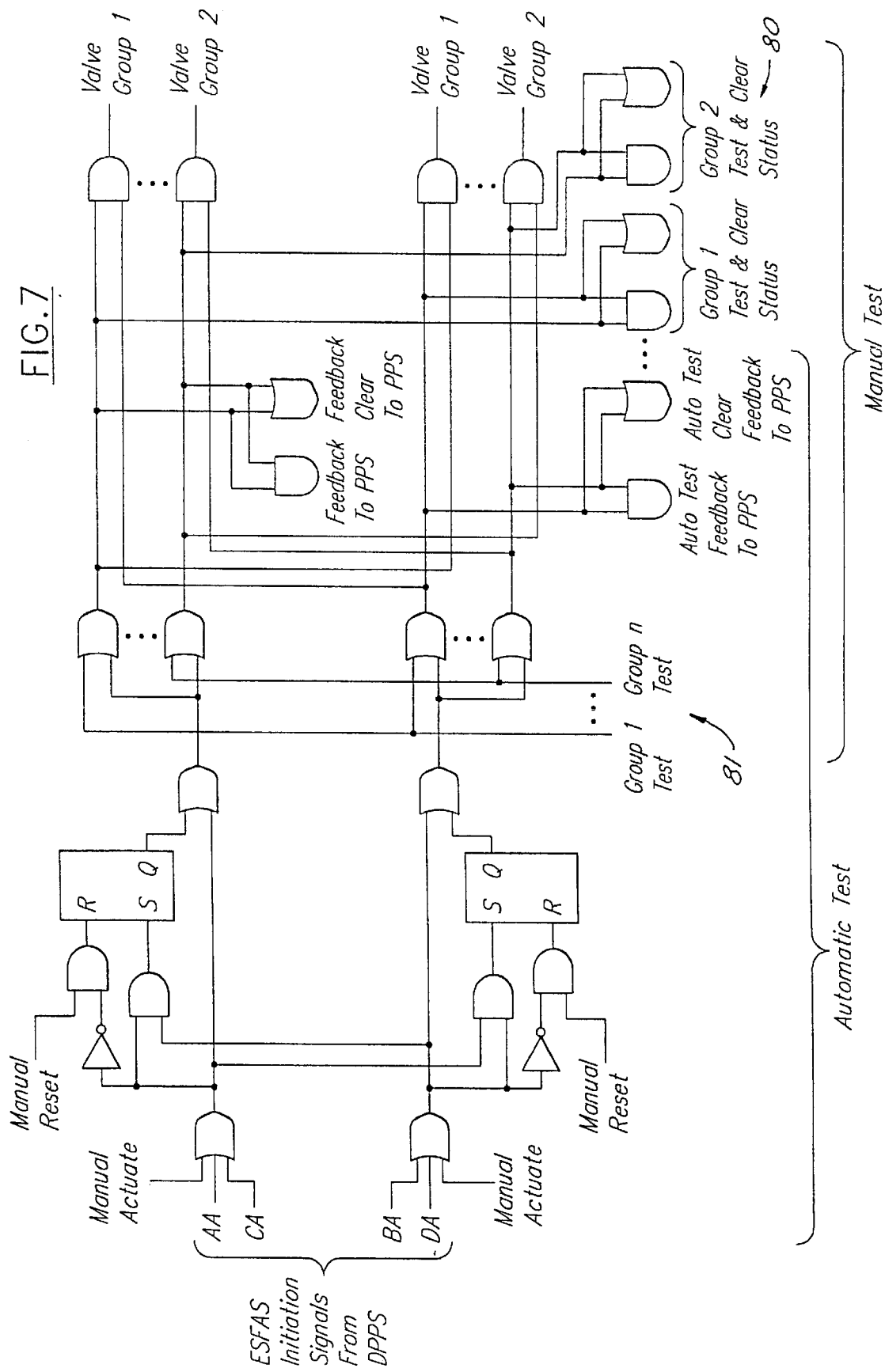
FIG. 7 is a simplified functional block diagram for a typical DESFAS auxiliary cabinet test logic arrangement.

FIG. 7 shows a simplified test logic system in block diagram form for use with the system thus described. The ESFAS initiation signals from DPPS are provided to input OR gates and channeled through the shown logic circuits to provide Group I test and clear status indicator outputs as seen at numeral 80. In a preferred embodiment, through Train A MTP 73 of FIG. 5, testing of the DESFAS actuation and initiation logic from the DPPS inputs to the selective two-out-of-four logic, shown in FIGS. 4 and 7, is enabled. Moreover, individual testing of each subgroup relay is enabled at 81 in FIG. 7. Finally, the test logic system of FIG. 7 also enables tests to verify that there are no spurious connections between groups of relays.

Figure 8:
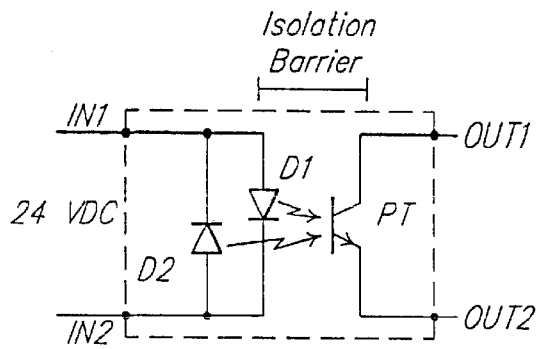
FIG. 8 is a schematic circuit of an optical coupler used to effect a measure of optical isolation.

In the design of plant protection systems it is important that circuits be isolated from one another so that a fault situation in one circuit will not affect the operation of another circuit. In general, the digital plant protection system disclosed herein utilizes programmed logic circuit (PLC) that are designed to provide a 24 VDC output that is switched on or off under the control of the logic. Since the PLC's are critical to system operation, it is important that they be isolated from fault situations. In accordance with the present invention, system integrity is assured by utilizing optical couplers at the output of the PLC's and in all other voltage-switching contexts. As shown in FIG. 8, the optical coupler OC includes a pair of PN light emitting diode, D1 and D2, that are parallel connected (in opposing conduction directions) across input terminals IN1 and IN2. A DC input voltage applied to the input terminals IN1 and IN2 will cause one of the two diodes (depending upon the polarity of the input voltage) to emit light. A photo-transistor PT has its emitter and base connected between output terminals OUTI and OUT2 and undergoes a change in trans-conductance as a function of the light emitted by the diode(s) driven into conduction. As a consequence, voltage levels applied to the terminals IN1 and IN2 will cause a corresponding change in the trans-conductance of the phototransistor PT. The input-to-output electrical isolation provided by a typical optical coupler can be in the 3–5 kilovolt range; accordingly, the isolation provided by opto-coupler can assure system integrity. In the context of digital plant protection systems, which require all devices to meet the IEEE Class 1E requirement, the use of opto-couplers in this context serves to increase system reliability.

Figure 9:
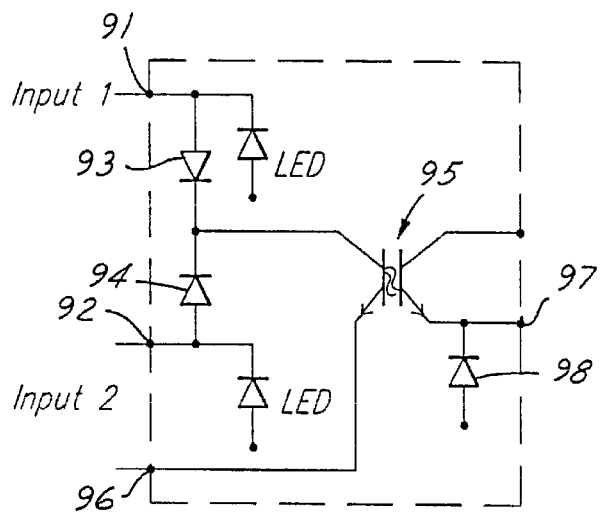
FIG. 9 is a circuit diagram for a dual opto-isolated coupler with a feedback indication for use with the system of this invention and other more general systems.

In the case of the DESFAS of the present invention, wherein multiple outputs from the DPPS are provided as input to the DESFAS, protection is required to prevent feedback from one input to the DESFAS from affecting another input. FIG. 9 shows an dual opto-isolated coupler with feedback indication for use with this or other inventions. Specifically, an opto-coupler was needed to allow the controlling output to be from either input 1 or input 2 with included protection from one input feeding back through to the other input. Input DC signals 91 and 92 are provided respectively to steering diodes 93 and 94 to provide an input to a collection of a photo-transistor in the opto-isolator 95. A negative input voltage source is shown at 96 while a positive output voltage is shown at 97 connected to the emitter of the coupled transistor in the opto-isolator 95. A feedback indicator 98 is in circuit with the coupled transistor to provide an indication of feedback.

Figure 10A:
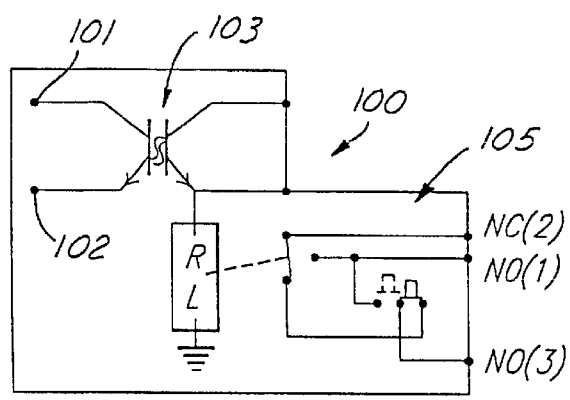
FIG. 10A is the optically isolated selectable system according to the invention.
Figure 10B:
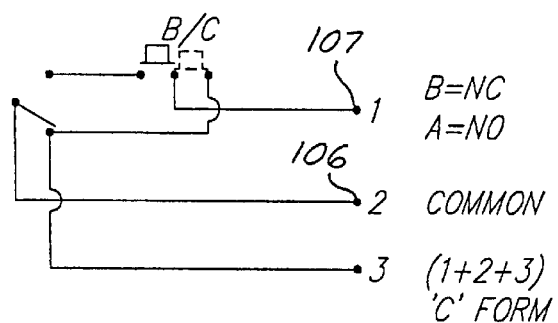
FIG. 10B is a circuit diagram showing a use of a selectable A or B type contact for the system of FIG. 10A, each of which is also capable of use with other systems.

FIGS. 10A and 10B shown a universal optically isolated selectable A,B type relay output for use with this or other inventions, as designated by the reference numeral 100. An input is provided from the PLC outputs of the circuit of FIG. 3 to the input terminals 101 and 102 in circuit with an opto-isolator 103 coupling a photo-transistor pair for operating a relay pair shown generally at numeral 105. The selectable A or B type contact arrangement is shown more specifically in FIG. 10B where terminal 106 is a common terminal, terminal 107 provides an output of either NC or NO state.

Figure 11:
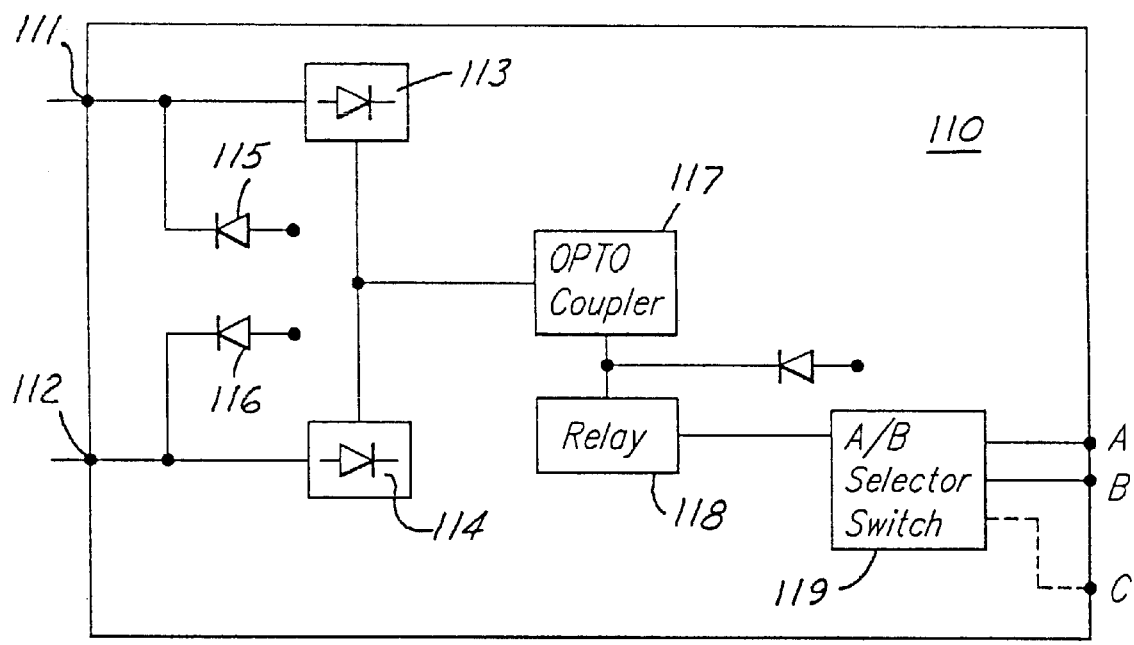
FIG. 11 is a functional block diagram for a dual input optically isolated selectable output relay module for use with the invention and with other systems.

FIG. 11 is another dual input optically isolated selectable output relay module, shown generally by the reference numeral 110 to provide a user with a selectable Form A or B contact and a Form C contact format with an additional wire. The inputs from the PLC outputs of FIG. 3 are provided to the inputs 111 and 112 in circuit with steering diodes 113 and 114 with input status LEDs 115 and 116 in circuit with the inputs to show the presence of a signal. The steered input is provided to an opto-coupler 117 driving a relay 118 for an A/B Selector Switch 119 to provide outputs as in FIGS. 9 and 10.

Figure 12:
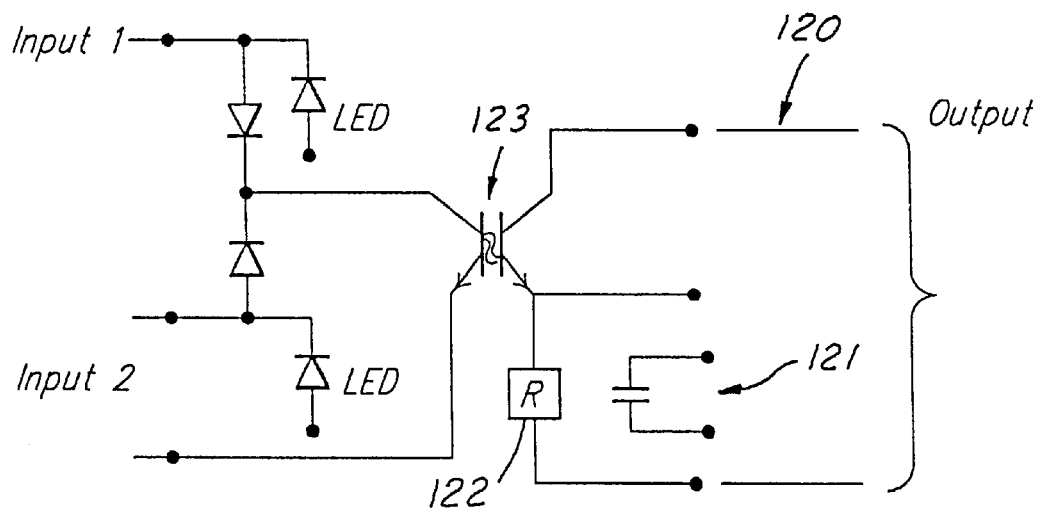
FIG. 12 is functional abbreviated circuit diagram for a dual input optically isolated output driver with isolated output status, for optional use with the invention or with other systems.

FIG. 12 is still another sample of such a dual input optically isolated output driver with an isolated output status, shown generally at the reference numeral 120. A separate optically coupled output 121 is provided by optically coupling the relay 122 output from the opto-coupler 123.

The DESFAS and its subcomponents described above provides a digital interface between a DPPS and any ESF system within a nuclear power plant. The DESFAS of the present invention continuously monitors the DPPS initiation circuit which governs each ESF system. Thus, the present invention provides an interface between the DPPS and remote actuation devices which effect remedial action in the event that the DPPS generates a 'trip' signal. According to the present invention, by using actuation inputs from the DPSS and manual, operator implemented inputs, controls are provided for remote equipment components, such as solenoid valves, motor operated valves, pumps, fans and dampers. The DESFAS may easily be coordinated with the prior discussed systems of an Automatic Self-Testing System and a Digital Plant Protection System, both of which are described in copending applications identified above. Together, the DPSS, the Automatic Self Testing System and the DESFAS of the present invention constitute a complete nuclear plant reactor protection system. In addition, the DESFAS system of present invention may easily be interfaced with other nuclear plant control component control systems.

In order to interface between DPPS and ESF systems, high energy initiation relay interfaces are provided to actuate safety related Class 1E circuits as required by any signals generated by the DESFAS of the present system. Moreover, to prevent unwanted feedback between input signals from the DPPS and output signals of the DESFAS, various optically isolated couplings are described.

Fiber optic connections are described between various components of the system. Using these fiber optic connections, both input tests and logic fault tests may be conducted to verify DESFAS operability without damaging the integrity of the DESFAS monitoring. Individual testing of each subgroup relay is also disclosed. Finally, a test logic system enables tests to verify that there are no spurious connections between groups of relays.

Preferred embodiments of the present invention have been disclosed. A person of ordinary skill in the art will realize, however, that certain modifications and alternative forms will come within the teachings of this invention. Therefore, the following claims should be studied to determine the true scope and content of the invention.

What is claimed is:

1. A digital engineered safety features actuation system, comprising:
    a plurality of logic trains, each logic train of said plurality of logic trains receives at least one initiation signal from a plant protection system and converts said at least one initiation signal to a plurality of logic train outputs,
    wherein said plurality of logic train outputs is provided to at least one component control system for controlling at least one engineered safety features system component,
    wherein said at least one initiation signal is received by at least one logic processor and at least one I/O device,
    wherein said at least one logic processor and said at least one I/O device provides said plurality of logic train outputs to said component control system, and
    wherein said at least one logic processor and said at least one I/O device is further connected to a train maintenance and test panel to monitor said at least one logic processor.

2. A digital engineered safety features actuation system as in claim 1, wherein said at least one initiation signal is a digital initiation signal.

3. A digital engineered safety features actuation system as in claim 2, wherein said digital initiation signal is conditioned.

4. A digital engineered safety features actuation system as in claim 1, wherein said at least one initiation signal is received from a plant protection system channel.

5. A digital engineered safety features actuation system as in claim 1, wherein said plurality of logic trains being two logic trains.

6. A digital engineered safety features actuation system as in claim 1, wherein said train maintenance and test panel initiates testing of the logic within said at least one logic processor.

7. A digital engineered safety features actuation system as in claim 1, wherein said plurality of logic trains are comprised of a plurality of logic and I/O groups.

8. A digital engineered safety features actuation system as in claim 7, wherein said plurality of logic and I/O groups being two logic and I/O groups.

9. A digital engineered safety features actuation system as in claim 8, wherein each of said plurality of component control systems control at least one of valves, dampers and pumps.

10. A digital engineered safety features actuation system, comprising:
    a plurality of logic trains, each logic train of said plurality of logic trains receives at least one initiation signal from a plant protection system and converts said at least one initiation signal to a plurality of logic train outputs,
    wherein said plurality of logic train outputs is provided to at least one component control system for controlling at least one engineered safety features system component,
    wherein said plurality of logic trains are comprised of a plurality of logic and I/O groups,
    wherein said plurality of logic and I/O groups being two logic and I/O groups,
    wherein each of said plurality of component control systems control at least one of valves, dampers and pumps, and
    wherein said at least one of said plurality of logic trains further include an I/O module and a programmable logic circuit.

11. A digital engineered safety features actuation system as in claim 10, wherein said programmable logic circuit actuates engineered safety feature relays on a selective two-out-of-four basis.

12. A digital engineered safety features actuation system as in claim 11, wherein said programmable logic circuit and said I/O module are further connected to a train maintenance and test panel to monitor said programmable logic circuit and said I/O module.

13. A digital engineered safety features actuation system as in claim 12, wherein said train maintenance and test panel further initiates testing of the logic within said programmable logic circuit and said I/O module.

14. A digital engineered safety features actuation system as in claim 13, wherein said programmable logic circuit and said I/O module are connected to said train maintenance and test panel by at least one fiber optic data line.

15. A digital engineered safety features actuation system as in claim 14, wherein said at least one of said plurality of logic trains further include a MANUAL ACTUATE input to selectively actuate said engineered safety features component.

16. A digital engineered safety features actuation system as in claim 15, wherein a specific logic train of said at least one of said plurality of logic trains further include a MANUAL RESET input to reset said specific logic train after an initiation signal pertaining to said specific logic train clears.

17. A digital engineered safety features actuation system as in claim 1, wherein said at least one of said plurality of logic trains actuates engineered safety features relays on a selective two-out-of-four basis.

18. A digital engineered safety features actuation system as in claim 17, wherein said at least one of said plurality of logic trains further includes a MANUAL ACTUATE input to selectively actuate said engineered safety features component.

19. A digital engineered safety features actuation system as in claim 18, wherein a specific logic train of said at least one of said plurality of logic trains further include a MANUAL RESET input to reset said specific logic train after an initiation signal pertaining to said specific logic train clears.

20. A digital engineered safety features actuation system as in claim 1, wherein said at least one initiation signal is optically isolated to prevent input feedback.

21. A digital engineered safety features actuation system as in claim 20, wherein said at least one initiation signal is optically isolated using an optically isolated output driver.

22. A digital engineered safety features actuation system as in claim 1, wherein said engineered safety features systems are actuated using at least one relay which accommodates said plurality of logic train outputs.

23. A digital engineered safety features actuation system as in claim 1, wherein said at least one of said plurality of logic trains communicate with said plant protection system using at least one fiber optic data line.

24. A digital engineered safety features actuation system, comprising:
    means for receiving at least one input initiation signal from a plant protection system;
    means for converting said at least one input initiation signal into a plurality of train output signals;
    means for providing said plurality of train output signals to actuate at least one engineered safety features system component,
    wherein said means for receiving at least one input initiation signal further includes means for manually providing said at least one input initiation signal.

25. A digital engineered safety features actuation system as in claim 24, further including means for removing said plurality of train output signals upon clearing of said at least one input initiation signal.

26. A digital engineered safety features actuation system as in claim 25, wherein said means for removing said plurality of train output signals includes a manual reset means.

* * * * *